(12) United States Patent
English

(10) Patent No.: US 6,279,465 B1
(45) Date of Patent: Aug. 28, 2001

(54) CAROUSEL GRILLE WITH ROTATING TINES

(76) Inventor: Todd English, 90 Main St., Charlestown, MA (US) 02129

( * ) Notice: Subject to any disclaimer, the term of this patent is extended or adjusted under 35 U.S.C. 154(b) by 0 days.

(21) Appl. No.: 09/711,827

(22) Filed: Nov. 14, 2000

(51) Int. Cl.[7] .............................. A23L 1/00; A47J 37/00; A47J 37/04
(52) U.S. Cl. ............................ 99/339; 99/419; 99/420; 99/421 H; 99/421 V; 99/427; 99/448; 99/450
(58) Field of Search ................. 99/339, 340, 403–418, 99/426, 427, 400, 401, 444–450, 482; 126/25 R, 9 R, 41 R

(56) References Cited

U.S. PATENT DOCUMENTS

| | | | |
|---|---|---|---|
| 2,581,570 | * | 1/1952 | Amanatides ........................ 99/421 V |
| 3,221,638 | * | 12/1965 | Wickenberg ........................ 99/421 P |
| 3,448,679 | * | 6/1969 | Holka et al. ........................ 99/421 R |
| 3,583,307 | * | 6/1971 | Lee, Sr. ................................. 99/446 X |
| 3,817,164 | * | 6/1974 | Hintze ................................. 99/421 V |
| 3,956,979 | * | 5/1976 | Coroneos ........................... 99/446 X |
| 4,270,444 | * | 6/1981 | Geissmann ......................... 99/421 P |
| 4,372,199 | * | 2/1983 | Brown et al. ........................... 99/341 |
| 4,512,248 | * | 4/1985 | Volakakis ........................... 99/447 X |
| 4,590,848 | * | 5/1986 | Willingham .......................... 99/339 |
| 4,979,439 | * | 12/1990 | Ferron-Zepeda .................. 99/421 R |
| 5,044,262 | * | 9/1991 | Burkett et al. .......................... 99/327 |
| 5,575,196 | * | 11/1996 | Masel et al. ........................ 99/448 X |

* cited by examiner

Primary Examiner—Timothy F. Simone
(74) Attorney, Agent, or Firm—Samuels, Gauthier & Stevens

(57) ABSTRACT

A carousel-like grille assembly which surrounds an oven. The carousel assembly carries tines which extend over the oven. The carousel assembly moves circumferentially around the oven while at the same time the tines rotate about their longitudinal axes. The net effect is the tines travel in a generally circular path over the oven while each tine is rotating.

8 Claims, 6 Drawing Sheets

CAROUSEL GRILLE WITH ROTATING TINES

BACKGROUND OF THE INVENTION

1. Field of the Invention

A grille having multiple rotatable tines.

2. Description of the Relevant Art

In restaurants, large kitchens and the like, one method of cooking meat, poultry and seafood products is to grille the products. It is known that similar or dissimilar products can be placed on multiple spits. The food product is skewed on the spit.

BRIEF SUMMARY OF THE INVENTION

The present invention comprises a grille, preferably a circular grille. The grille comprises at least four components. There is an oven, an inner housing, an outer housing and a carousel-like assembly interposed between the housings. The carousel carries tines which extend over the oven.

The inner housing, which surrounds the oven, has a bearing surface which surface defines a generally circular perimeter.

The outer housing encloses the inner housing while leaving the oven/grate open.

The carousel-like assembly is received between the inner and outer housings. This assembly engages the bearing surface of the inner housing in a moveable manner. The assembly has a plurality of circumferentially arrayed tine holder stations which are adapted to hold tines which extend over the oven each along a longitudinal axis. The stations are fixedly secured to the assembly. Means are provided for moving the assembly circumferentially around the oven while traveling on the bearing surface while the tines rotate about their longitudinal axes. The net effect is the tines travel in a generally circular path or revolve around and over the oven while each tine is rotating.

If desired, the fuel in the oven can be banked unevenly to provide different temperature zones through which the food products will travel while rotating. A grate is also preferred at least partially covering the oven whereby if it is desired to sear the food product, the tine can simply be removed from the station and the food product placed directly on the grate.

DESCRIPTION OF THE PREFERRED EMBODIMENT(S)

Grille

Outer Housing

Figure 1:
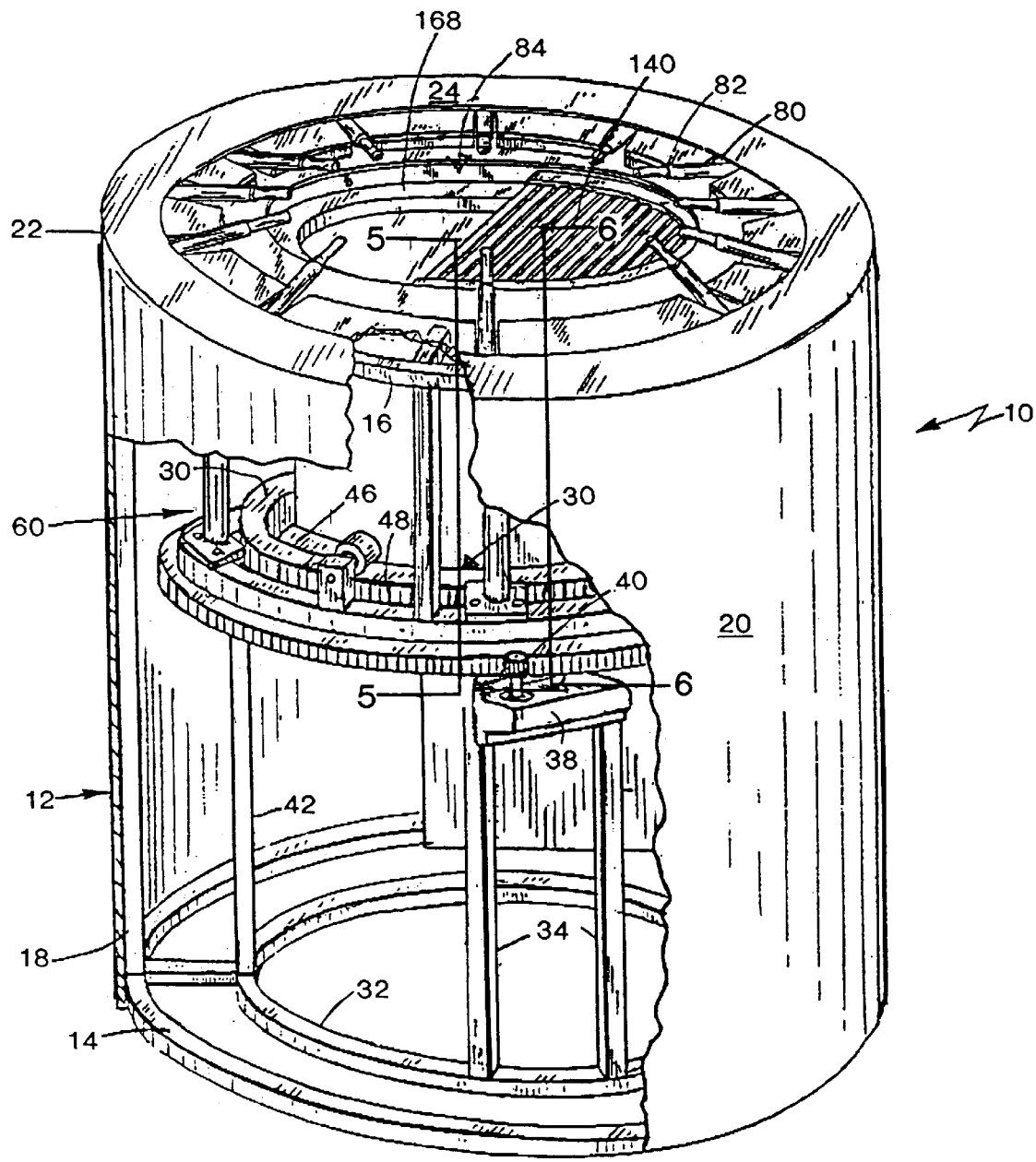
FIG. 1 is a perspective view partly broken away of a grille embodying the invention.

Referring to FIG. 1, a grille embodying the invention is shown generally at 10 and comprises an outer cylindrical housing 12 having an outer lower support ring 14, an outer upper support ring 16 and vertical supports 18 (only one shown) securing the rings 14 and 16. The rings 14 and 16 are enclosed by a wall 20 having an upper edge 22 and an inwardly extending lip 24. Arms 26 extend inwardly from the outer support ring 16 and support the lip 24, see FIGS. 5 and 6.

Inner Housing

Figure 5:
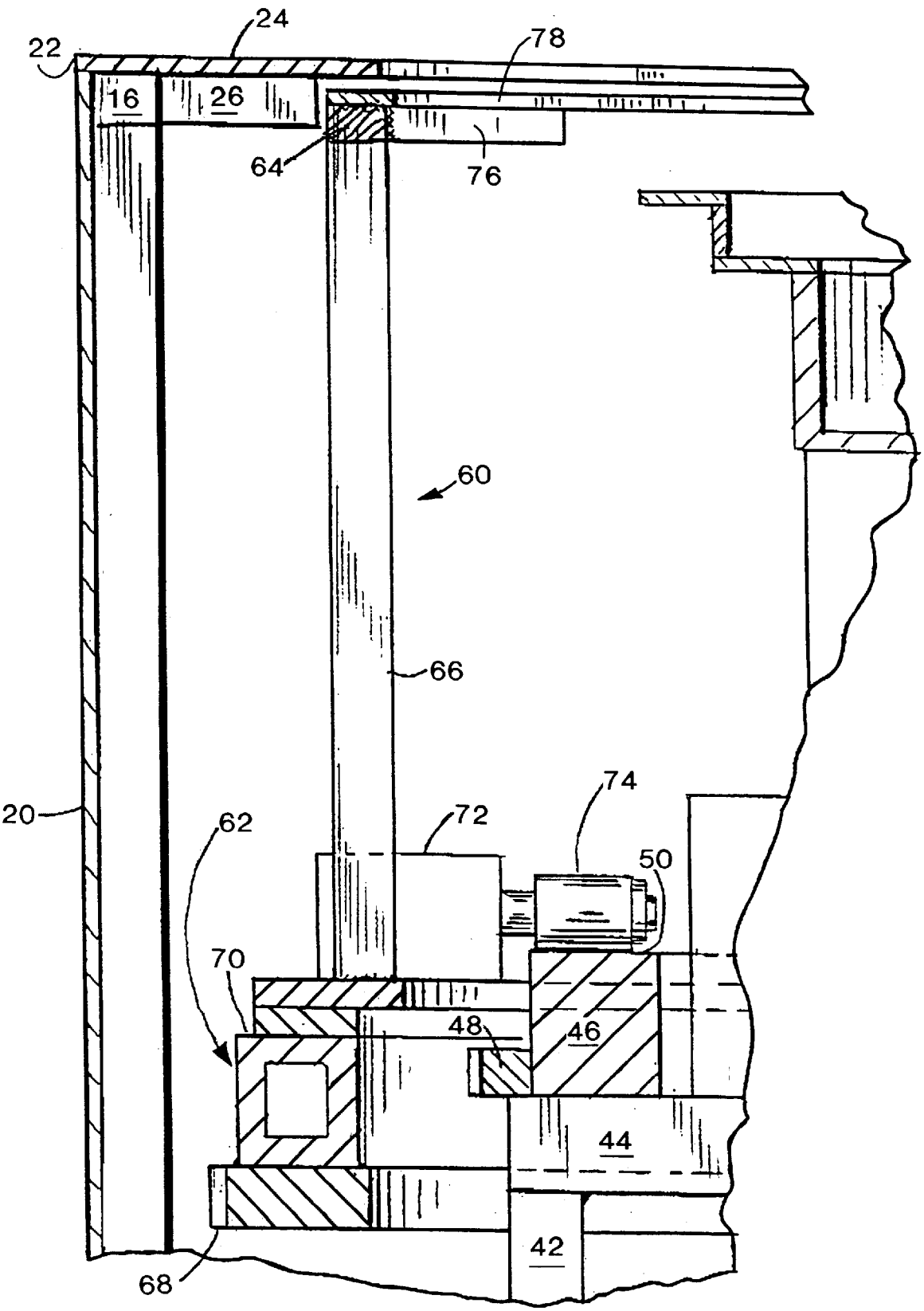
FIG. 5 is a fragmentary sectional view taken along lines 5—5 of FIG. 1.
Figure 6:
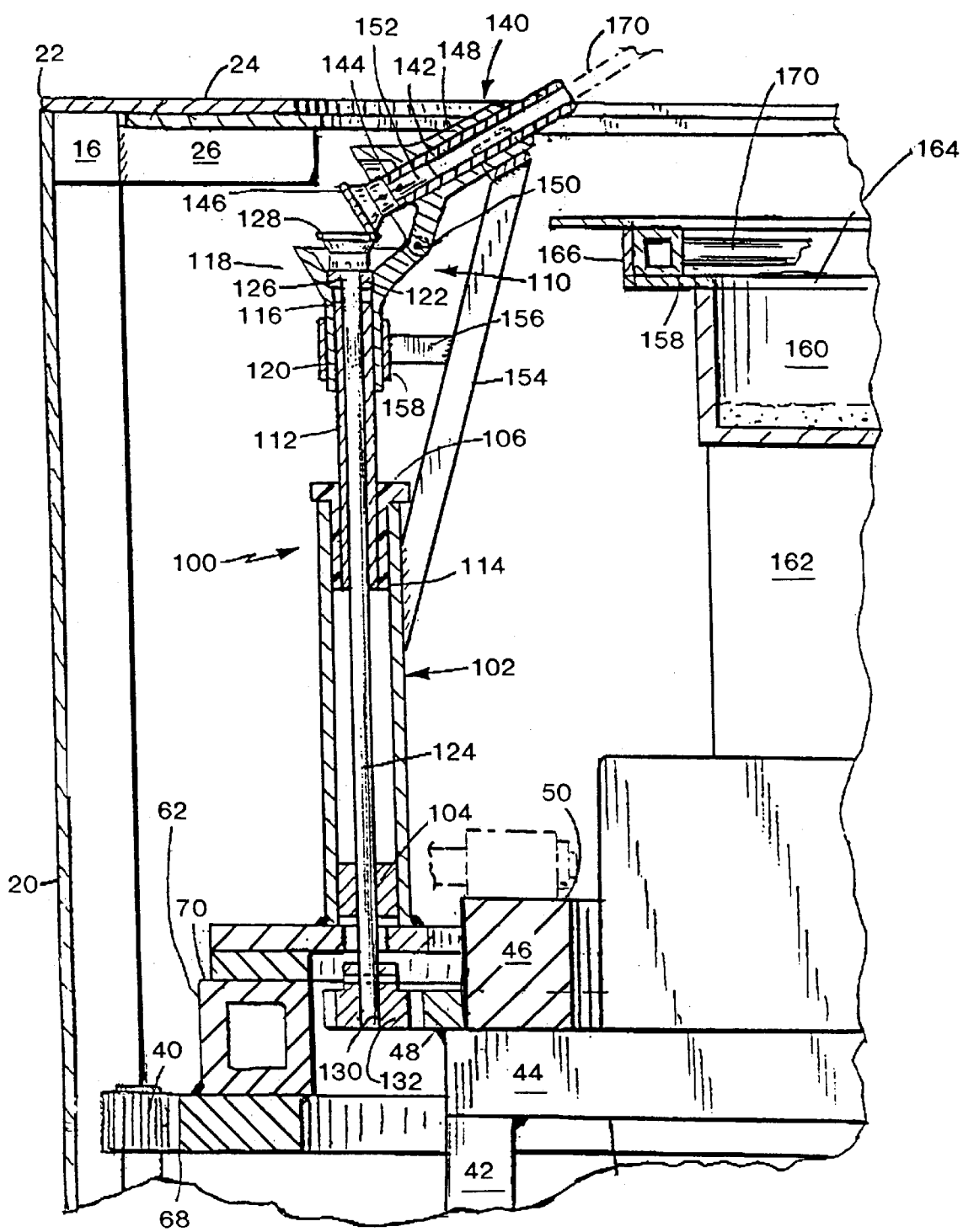
FIG. 6 is a fragmentary sectional view taken along lines 6—6 of FIG. 1.

Referring to FIGS. 1, 5 and 6, the inner housing 30 comprises a lower inner support ring 32 and motor support legs 34. Secured to the support legs 34 is a motor 38 having a drive gear 40. Vertical supports 42 (only one shown) extend upwardly from the ring 32 and support an upper ring 44. The upper ring 44 supports a track 46 which track 46 has an outer toothed surface 48 and a bearing surface 50.

Carousel Assembly

Figure 2:
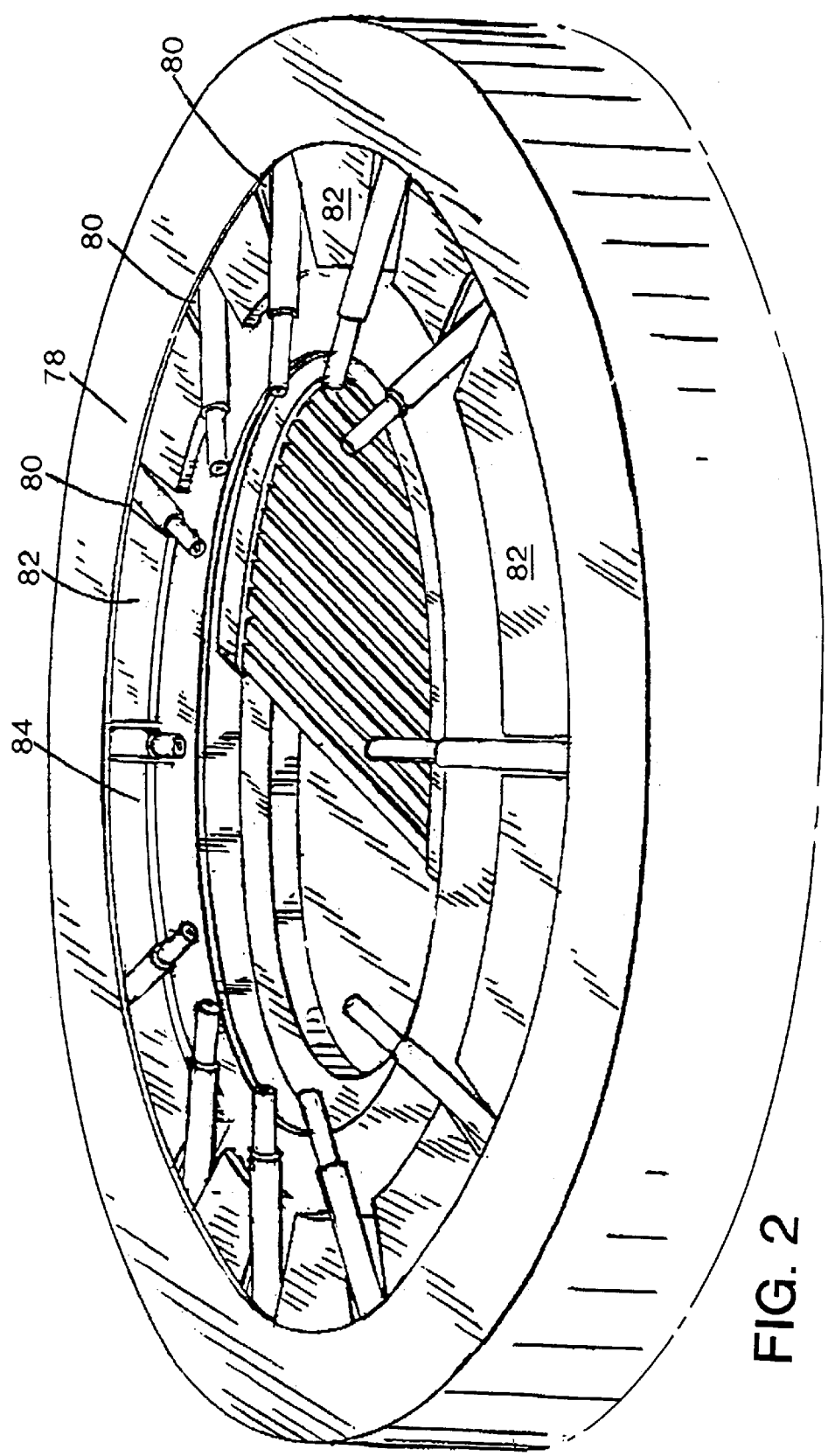
FIG. 2 is a perspective view of a top section of the grille.
Figure 3:
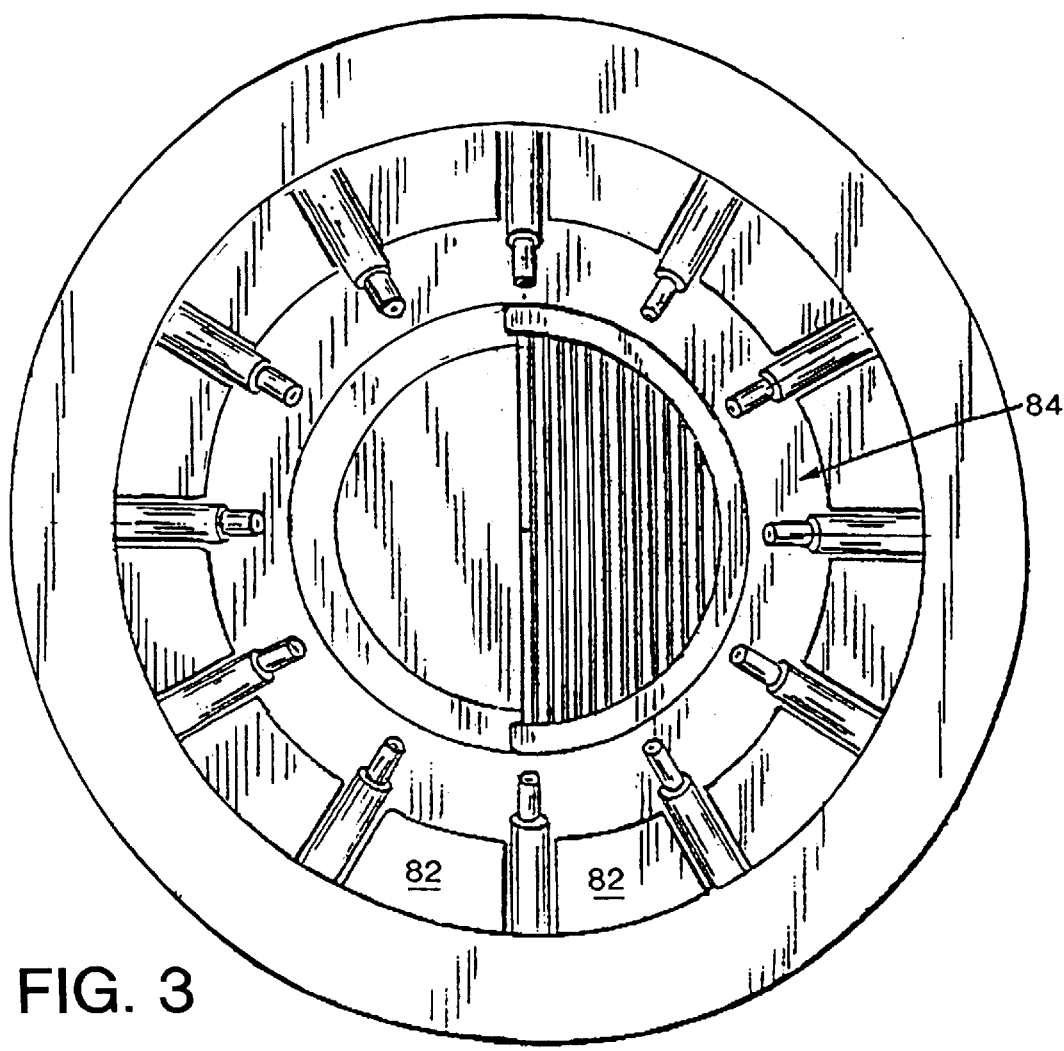
FIG. 3 is a plan view of FIG. 1.

A carousel assembly 60, referring to FIGS. 1 and 5, comprises a lower toothed ring 62, an upper support ring 64, the rings 62–64 secured to one another by vertical supports 66 (only one shown). The lower ring 62 has a stepped outer toothed surface 68 and a top surface 70. The drive gear 40 of the motor 38 in the outer housing 12 engages the toothed surface 68. A pillow block 72 (only one shown) is secured to the surface 70. Extending from the block 72 is a roller 74 which is supported by and travels on the bearing surface 50 of the track 46 which forms part of the inner housing 30. At the upper ends of the vertical supports 66 are arms 76 (only one shown) which extend inwardly. The arms 76 support an inwardly extending apertured flat ring 78 having apertures 80. The apertures 80 define shields 82 therebetween, see FIGS. 1, 2 and 3. Preferably, under each shield is a support arm 76. The inner perimeter of the ring 78 defines a central opening 84.

Referring to FIG. 6, secured to the top surface 70 of the lower ring 62 are rotatable tine holder assemblies 100 (only one shown in detail). The assemblies 100 comprises a tubular support housing 102 having a sleeve bearing 104 and a tubular cap 106. The lower end of the housing 102 is secured, such as by welding, to the lower support ring 62. A tine drive assembly 110 comprises a support sleeve 112 having a lower end 114 and an upper end 116. A cone-like holder 118 has a depending sleeve 120 secured to the upper end 116. A bushing 122 is received in the holder 118.

A drive shaft 124 has an upper end 126 to which is secured a bevel gear 128. The drive shaft 124 passes through the bushing 122, the sleeve 112 and the sleeve-bearing 104 and terminates at a lower end 130. Secured, such as by staking, to the lower end 130 is a driven gear 132 which driven gear 132 which meshes with the toothed ring 48 of the inner housing 30.

A chuck assembly 140 engages the bevel gear 128. The chuck assembly 140 comprises a hollow shaft 142 having in its lower end 144 a bevel gear 146 which meshes with the bevel gear 128. The shaft 142 is rotatably received in a sleeve 144 which is pinned to the holder 118 at 150. The shaft 144 is also characterized by a semi-circular locking flat 152 formed in its lower end. As will be described, the tines used with the chuck assemblies have mirror image locking flats at their lower ends so that when they are placed in the shaft 144 they will rotate with the shaft 144. A strut 154 is secured to the sleeve 148 and to the tubular support housing 102. A support 156 extends from the strut 154 and is secured to a support sleeve 158 which in turn is secured to the sleeve 120.

Oven

An oven 160 rests on a support 162. The oven is open at 164 and has a stepped outer wall 166 having a step 168. Received in the step 168 is a grate 170. The oven 160 is in registration with the opening 184. The oven 160/support 162 are located internally of the rings 32 and 34 of the inner housing 30.

Operation

In the operation of the invention, the fuel is ignited in the oven and a fire is maintained.

Figure 4:
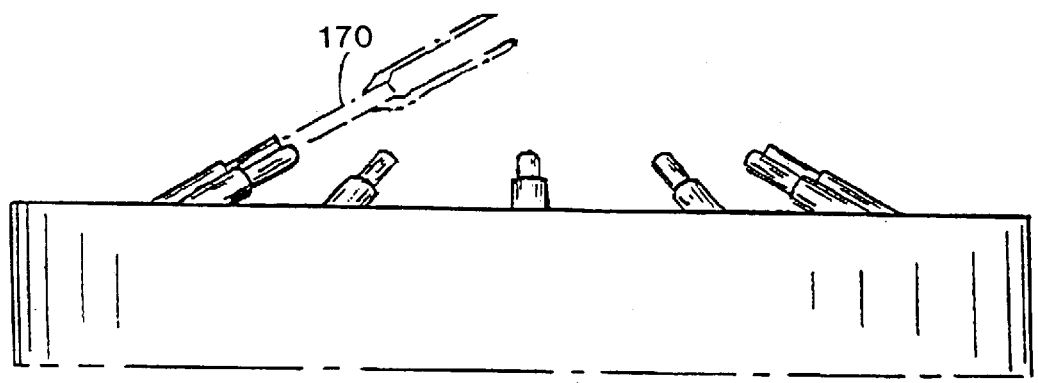
FIG. 4 is an illustration of a tine inserted into a rotatable station.
Figure 7:
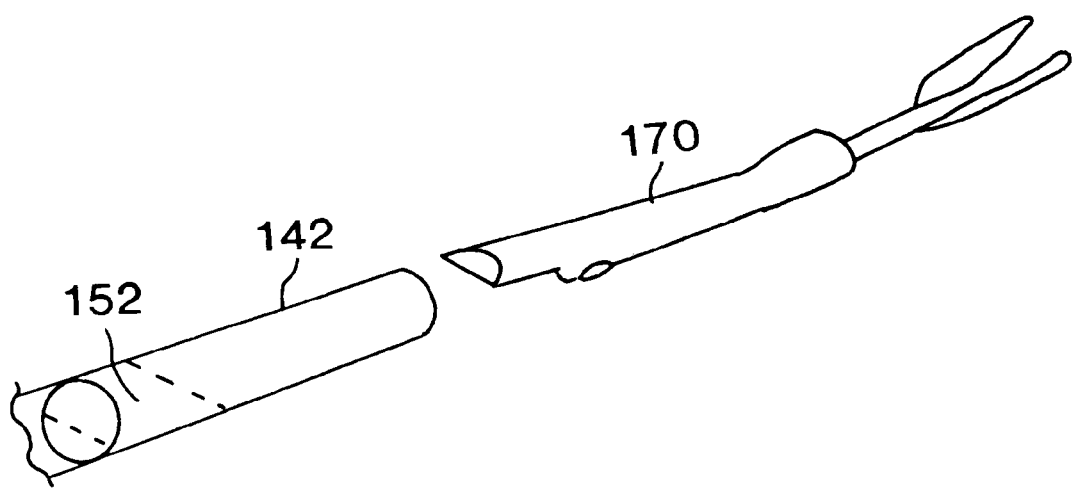
FIG. 7 is an illustration of a tine secured to a rotating shaft.

Referring to FIG. 4, only a single tine 170 is shown. The tine 170, see FIG. 7, has at its lower end a semi-circular locking flat 172. This locking flat engages the locking flat 152 formed in the shaft 144 shown in dotted lines. As will be understood, each of the shafts may have a tine received therein, only one of the shafts may have a tine received therein or any combination of shafts can have tines received therein carrying various food products.

The motor 38 is actuated, rotating drive gear 40. The drive gear 40 engages the toothed surface 68 of the ring 62. The ring 62 is supported on the bearing surface 50 of the track 46 of the inner housing assembly 30. Specifically, the rollers 74 travel on the bearing surface 50. The motor 38 drives the carousel assembly 60 causing the tines 170 to revolve over the oven 160.

The driven gear 132 on the drive shaft 124 of the tine assembly 100 engages or meshes with the toothed surface 48 of the fixed track 46. Movement of the carousel assembly 60 causes the driven gear 132 and the drive shaft 124 to rotate. The rotation of the drive shaft 124 causes the bevel gear 128 to rotate, which in turn engages the bevel gear 146 of the shaft 142 causing the shaft 142 to rotate. The tine 170 being releasably locked to the shaft 142 also rotates.

As described, the revolution of all tines over the oven 160 while the tines 170 rotate is basically uniform. Different tines can rotate at different speeds of rotation simply by changing the gear ratio between the gears 128, 146. Alternatively and/or the gearing ratio between the driven gear 132 and the toothed surface 48 can also be varied.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention what I now claim is:

1. A grille which comprises:
   an outer housing;
   an inner fixed housing having a rail defining a perimeter, the rail having a bearing surface;
   an oven received within the inner housing and having an upper open surface;
   a carousel-like assembly having a plurality of rotatable tine stations secured thereto, which stations extend over the oven, each station having a longitudinal axis;
   means for engaging the assembly to the bearing surface of the inner housing;
   means for driving the assembly along the perimeter of the rail;
   means for rotating the stations about their longitudinal axes while the assembly travels on the rail whereby tines inserted into the stations extend and revolve over the oven and travel along a path defined by the rail while simultaneously rotating about their longitudinal axes.

2. The grille of claim 1 wherein the outer housing is fixed and wherein the means for driving the carousel is secured to the outer housing.

3. The grille of claim 2 wherein the means secured to the outer housing comprises a motor having a drive gear, which drive gear engages and moves the assembly.

4. The grille of claim 1 wherein the assembly comprises a lower ring, the lower ring characterized by a toothed outer surface and wherein the means for driving the assembly engages said toothed surface.

5. The grille of claim 4 wherein means for driving comprises a drive gear which engages the toothed surface of the lower ring.

6. The grille of claim 1 wherein the means for engaging the assembly to the bearing surface of the inner housing comprises a plurality of rollers secured to the assembly which rollers engage the bearing surface of the inner housing.

7. The grille of claim 1 wherein the rail is circular and is characterized by a peripheral toothed surface.

8. The grille of claim 7 wherein the means for rotating the stations about their longitudinal axes comprises a chuck assembly having an upper end and a lower end, a tine adapted to be received and secured in the upper end, a drive shaft having an upper end and a lower end, the upper end engaging the lower end of the chuck assembly and the lower end engaging the peripheral toothed surface whereby rotation of the assembly drives the drive shaft causing the rotation of the chuck assembly and thereby the tines.

* * * * *